(No Model.)
J. S. PEABODY.
HOLDER FOR TEA BALLS, STRAINERS, &c.
No. 514,427. Patented Feb. 6, 1894.
FIG. 1
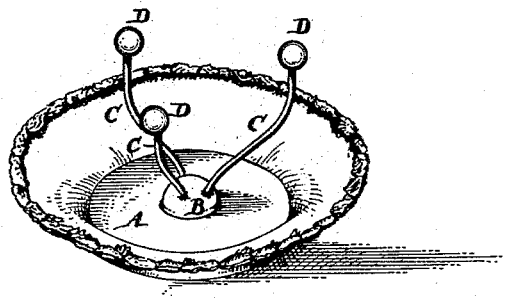
FIG. 3
FIG. 2
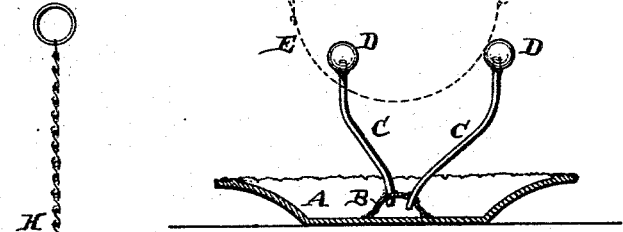
FIG. 4
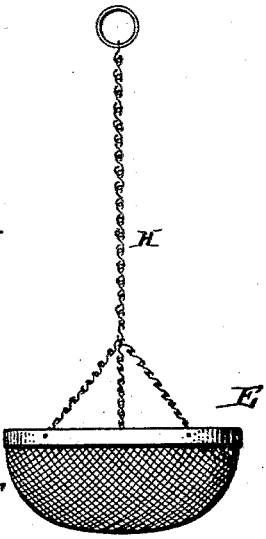
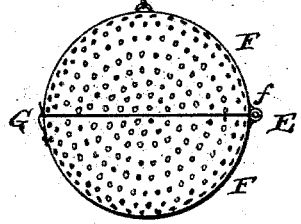
WITNESSES:
Henry Drury
INVENTOR:
John S. Peabody
By his atty.

UNITED STATES PATENT OFFICE.

JOHN S. PEABODY, OF SALEM, MASSACHUSETTS, ASSIGNOR TO JOHN F. SIMONS, FREDERICK M. SIMONS, AND EDWIN S. SIMONS, OF PHILADELPHIA, PENNSYLVANIA.

HOLDER FOR TEA BALLS, STRAINERS, &c.

SPECIFICATION forming part of Letters Patent No. 514,427, dated February 6, 1894.

Application filed April 25, 1893. Serial No. 471,758. (No model.)

*To all whom it may concern:*

Be it known that I, JOHN S. PEABODY, of Salem, Essex county, and State of Massachusetts, have invented an Improvement in Holders for Tea Balls, Strainers, &c., of which the following is a specification.

My invention has reference to holders for tea balls, strainers, &c., and consists of certain improvements which are fully set forth in the following specification and shown in the accompanying drawings which form a part thereof.

My invention relates to an article of tableware and consists essentially of a suitable support adapted to sustain a device through which tea or coffee may be strained. Said support is adapted to catch the dripping from the strainer or tea holding device after the same has been used.

My invention is particularly adapted for use in connection with what are known as "tea balls" which are composed of two semi-spherical parts hinged together and perforated so that tea contained within the same may be subjected to the action of boiling water in a cup until the desired strength of tea has been made, after which the said tea ball is lifted by a chain and supported in position upon the support or holder so that it may drain its liquid contents into the tray or saucer of the holder or support.

Referring to the drawings, Figure 1 is a perspective view of a holder embodying my improvements. Fig. 2 is a sectional elevation of the same. Fig. 3 is an elevation of a tea ball; and Fig. 4 is an elevation of a suitable strainer adapted for use in connection with tea or coffee and may be taken as a substitute for the tea ball shown in Fig. 3.

A is the base of the holder and is formed saucer shaped so as to be adapted to receive and hold the drippings from the tea ball or strainer. To the center of the saucer A is secured an inverted cup piece B to which are secured upwardly projecting arms C, preferably three in number, which radiate so that their ends are considerably separated. The ends of these arms are preferably mounted with small balls D to prevent scratching or injury to the tea ball E, which may be of any of the usual constructions and of slightly larger diameter than the space between the arms at the top so that it rests at three points of contact.

The tea ball as usually constructed is shown in Fig. 3, and consists of two semi-spherical parts F F hinged together at *f* and adapted to be held in closed position by snap spring G. The chain H is connected to one of the spherical parts F and is adapted for use in suspending the ball in a cup of hot water or in removing the same therefrom. The tea leaves are placed within the ball E, and while in that confined position are subjected to the action of boiling water in the cup. When the ball is placed upon the arms of the holder, any water or tea liquid contained within it is permitted to drain into the saucer or base A.

In place of the tea ball shown in Fig. 3, it is sometimes customary to use a form of strainer E such as shown in Fig. 4, consisting essentially of one half of the tea ball, but composed, if desired, of fine strainer cloth in place of perforated sheet metal. It is suspended in the same manner from a chain H. This strainer may be used in connection with tea, or simply as a strainer for coffee.

I do not confine myself to the number of arms or to the particular shape of the said arms of the holder, nor is it essential to my invention that the free ends of the arms are mounted with balls. The arms may be secured to the saucer in any suitable place instead of the center. It is also evident that the base of the arms may be secured to the tray A in any suitable manner, for instance, the part B may be stamped upwardly from the base of the tray A and the arms C soldered thereon, if so desired.

While I prefer the construction shown as being the simplest and best adapted to the purposes, I do not confine myself to the minor details thereof as they may be modified in various ways without departing from the principles of my invention.

What I claim as new, and desire to secure by Letters Patent, is—

As an article of manufacture, a tea ball or strainer holder consisting of a saucer shaped base A and a series of small arms C carried by the base and having their free ends extending upwardly and outwardly and provided on their extremities with balls or rounded portions D so that the extremity of each arm forms a point of support for the ball or strainer.

In testimony of which invention I have hereunto set my hand.

JOHN S. PEABODY.

Witnesses:
JOHN P. PEABODY,
ARTHUR A. AVERILLE.